Oct. 7, 1930.  W. F. WILLIAMS  1,777,342

BUMPER

Filed June 8, 1929

INVENTOR:
W. F. Williams
BY H. J. Sanders
ATTORNEY

Patented Oct. 7, 1930

1,777,342

UNITED STATES PATENT OFFICE

WILLIAM F. WILLIAMS, OF CHICAGO, ILLINOIS

BUMPER

Application filed June 8, 1929. Serial No. 369,336.

This invention relates to improvements in bumpers for vehicles and more particularly to automobile bumpers. One object is to provide a bumper of maximum efficiency that is simple in construction and durable in use.

With the foregoing and other objects in view the invention consists in the combination and arrangement of parts to be hereinafter fully described, pointed out in the claims and illustrated in the accompanying drawing which forms a part of this application for patent and in which—

Like reference characters denote corresponding parts throughout the several views.

Figure 1:
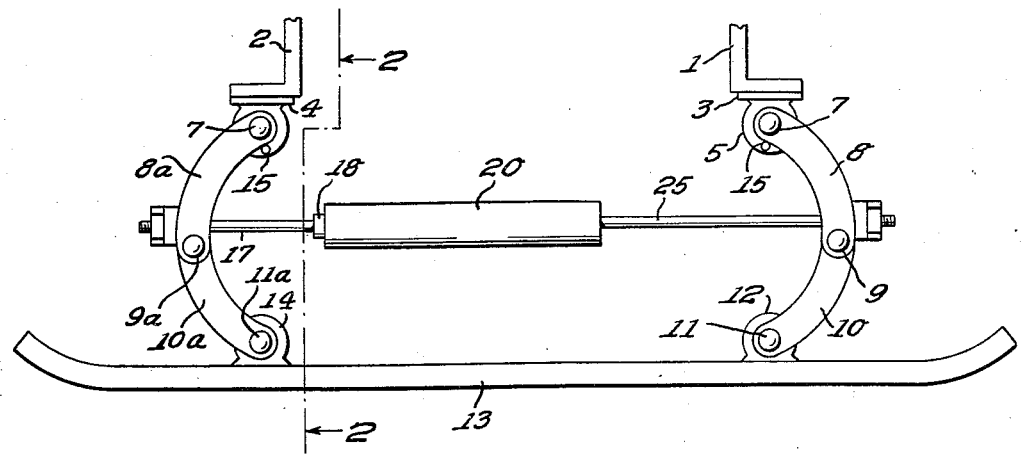
Fig. 1 is a top plan of the bumper.
Figure 2:
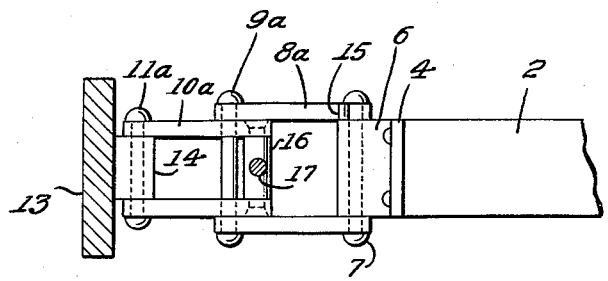
Fig. 2 is a cross sectional view taken on the line 2—2 of Fig. 1.
Figure 3:
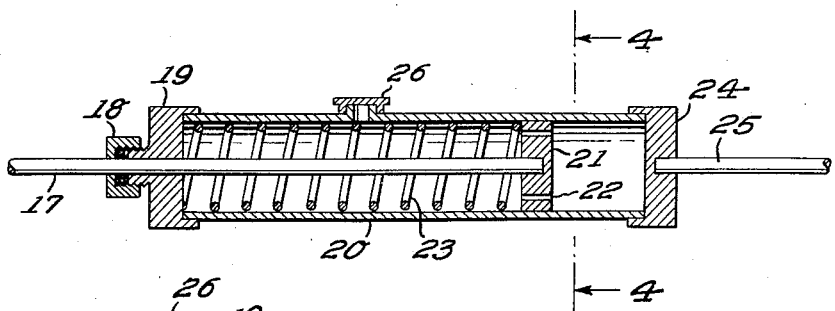
Fig. 3 is an enlarged longitudinal sectional view through the liquid container employed.
Figure 4:
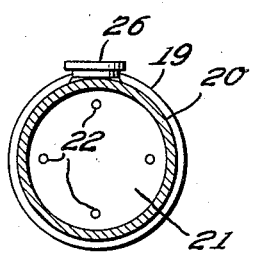
Fig. 4 is a view in vertical cross section on the line 4—4 of Fig. 3.

The bumpers now in use generally are adapted either to absorb light blows or heavy blows or shocks but are not efficient for blows or shocks of both classes. The present bumper is so constructed that it will absorb equally well any blow whether light or heavy. The lighter blow is absorbed by an expansion coil spring and the heavy blow by the spring and immediately thereafter by hydraulically controlled means. Formerly bumpers of the heavy blow absorbing type would protect the vehicles to which they were attached but their resistance to lighter blows would permit damage to vehicles delivering light blows against them.

The present bumper will give with a slight blow and so avoid damage to fenders, running boards etc. of other vehicles thus making it a "courtesy bumper" as well as a highly dependable bumper at all times.

The present invention is quite similar to the invention disclosed in my Patent No. 1,704,995 of March 12, 1929, except that hydraulically controlled mechanism is substituted for the springs of the said patent.

The reference numerals 1, 2 denote a pair of brackets connected directly to the vehicle body, or to the springs thereof, and having secured thereto the plates or flanges 3, 4 of the cylindrical bearing blocks 5, 6 through the longitudinal center of each of which a pin 7 extends, the pin 7 of the block 5 pivotally connecting a pair of arcuate links 8 to the ends of said blocks, the ends of said links 8 remote from said block being pivotally connected by another pin 9 to a second pair of arcuate links 10 pivotally connected by a bolt 11 to the boss 12 formed upon the buffer bar 13.

The pin 7 of block 6 connects a pair of arcuate links 8ª to said block while a pin 9ª connects said links 8ª to the links 10ª which at their opposite ends are pivotally connected by bolt 11ª to the boss 14 of buffer bar 13. The links 8, 10 are similar in all respects to the links 8ª, 10ª except that they are curved in opposite directions and so made "rights and lefts." Each block 5 and 6 is provided with a stop pin 15 for the pair of links connected thereto.

The inner ends of the links 10ª are connected by a post 16 to which one end of the piston rod 17 is secured that passes through the gland 18 and cylinder head 19 into the cylinder 20 that carries the piston 21 arranged in said cylinder and provided with a plurality, preferably four in number, of perforations 22, an expansion coil spring 23 within said cylinder between said piston and head serving yieldingly to retain said members the maximum distance apart.

The second cylinder head 24 is connected by the support bar 25 to a post connecting the inner ends of the links 10 and similar in all respects to the said post 16, said posts normally being disposed diametrically opposite each other.

The cylinder 20 is adapted to contain a liquid, preferably a mixture of a petroleum product and castor oil which is introduced through a cylinder orifice provided with the cap 26. This cylinder is filled three-quarters, more or less, full of the liquid. It is now ready for use. When an object strikes the buffer bar 13 it will most likely force one end thereof inwardly thus tending to pull the support bar 25 or the piston rod 17 outwardly with respect to each other. The shock will at first be met by the spring 23 and if it is but a slight shock or impact the spring will absorb it. A crash, however, will so contract the spring that the oil or liquid will receive the shock and be forced through the perforations 22 into that portion of the cylinder between the piston and the head 24. This action of the liquid will cushion the blow and so prevent damage to the vehicle. After the force of the impact is dissipated the spring will expand again and so reposition the parts of the bumper again.

What is claimed is:—

1. In a bumper, a buffer bar, pivotally connected supports therefor, and hydraulically controlled shock-absorbing mechanism connecting said supports.

2. In a bumper, a buffer bar, pivotally connected supports therefor arranged in right and left hand sets, and hydraulically controlled mechanism connecting said sets.

3. In a bumper, a buffer bar, pivotally connected supports therefor, posts carried by said supports and normally disposed diametrically opposite each other, and hydraulically controlled mechanism connecting said posts.

4. In a bumper, a buffer bar, pivotally connected supports therefor, posts carried by said supports, a cylinder, a support for one end of said cylinder connected to one of said posts, a piston rod connected to the other post and extending into said cylinder, a perforated piston upon said piston rod, and a spring within said cylinder abutting said piston and one end of the cylinder.

In testimony that I claim the foregoing as my own I have hereto affixed my signature.

WILLIAM F. WILLIAMS.